(12) United States Patent
Kuji et al.

(10) Patent No.: US 9,235,086 B2
(45) Date of Patent: Jan. 12, 2016

(54) LIQUID CRYSTAL DISPLAY DEVICE

(71) Applicants: Tatsuaki Kuji, Saitama-ken (JP); Arihiro Takeda, Saitama-ken (JP)

(72) Inventors: Tatsuaki Kuji, Saitama-ken (JP); Arihiro Takeda, Saitama-ken (JP)

(73) Assignee: Japan Display Inc., Tokyo (JP)

( * ) Notice: Subject to any disclaimer, the term of this patent is extended or adjusted under 35 U.S.C. 154(b) by 435 days.

(21) Appl. No.: 13/652,861

(22) Filed: Oct. 16, 2012

(65) Prior Publication Data
US 2013/0114033 A1    May 9, 2013

(30) Foreign Application Priority Data

Nov. 8, 2011    (JP) .................................. 2011-244529

(51) Int. Cl.
*G02F 1/1343*    (2006.01)

(52) U.S. Cl.
CPC .... *G02F 1/134309* (2013.01); *G02F 1/134336* (2013.01); *G02F 1/134363* (2013.01); *G02F 2001/134381* (2013.01)

(58) Field of Classification Search
CPC .............. G02F 1/1362; G02F 1/13677; G02F 1/136286; G02F 1/1343; G02F 1/134309; G02F 1/134336
USPC .................................. 349/129, 139, 141, 143
See application file for complete search history.

(56) References Cited

U.S. PATENT DOCUMENTS

| | | | |
|---|---|---|---|
| 6,266,116 B1 | 7/2001 | Ohta et al. | |
| 8,144,297 B2 * | 3/2012 | Nakayoshi et al. | ............ 349/141 |
| 2001/0010575 A1 * | 8/2001 | Yoshida et al. | ................ 349/141 |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

Office Action issued Feb. 3, 2015 in Japanese Patent Application No. 2011-244529 (submitting English translation only).

*Primary Examiner* — Dung Nguyen
(74) *Attorney, Agent, or Firm* — Oblon, McClelland, Maier & Neustadt, L.L.P.

(57) ABSTRACT

In one embodiment, a liquid crystal display device includes a first substrate and a second substrate arranged facing the first substrate with a gap. A plurality of pixels is arranged in a matrix of a first direction and a second direction orthogonally crossing the first direction. The length of the pixel along the first direction is shorter than that along the second direction. Each pixel includes a main pixel electrode formed on the first substrate extending in the second direction, and main common electrodes formed on the second substrate extending in the second direction and arranged so as to sandwich the main pixel electrode in the first direction. Further, each pixel includes a plurality of regions in which an inter-electrode distance between the main pixel electrode and the main common electrode in the first direction differs mutually in the respective regions.

6 Claims, 8 Drawing Sheets

(56) References Cited

FOREIGN PATENT DOCUMENTS

| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2000-81641 A | 3/2000 |
| JP | 2005-3802 | 1/2005 |
| JP | 3644653 | 2/2005 |
| JP | 2005-242307 | 9/2005 |
| JP | 2009-300555 A | 12/2009 |

\* cited by examiner

LIQUID CRYSTAL DISPLAY DEVICE

CROSS-REFERENCE TO RELATED APPLICATION

This application is based upon and claims the benefit of priority from prior Japanese Patent Application No. 2011-244529, filed Nov. 8, 2011, the entire contents of which are incorporated herein by reference.

FIELD

Embodiments described herein relate generally to a liquid crystal display device.

BACKGROUND

In recent years, a flat panel display is developed briskly. Especially, the liquid crystal display device gets a lot of attention from advantages, such as light weight, thin shape, and low power consumption. In an active matrix type liquid crystal display device equipped with a switching element in each pixel, a structure using lateral electric field, such as IPS (In-Plane Switching) mode and FFS (Fringe Field Switching) mode, attracts attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Figure 1:
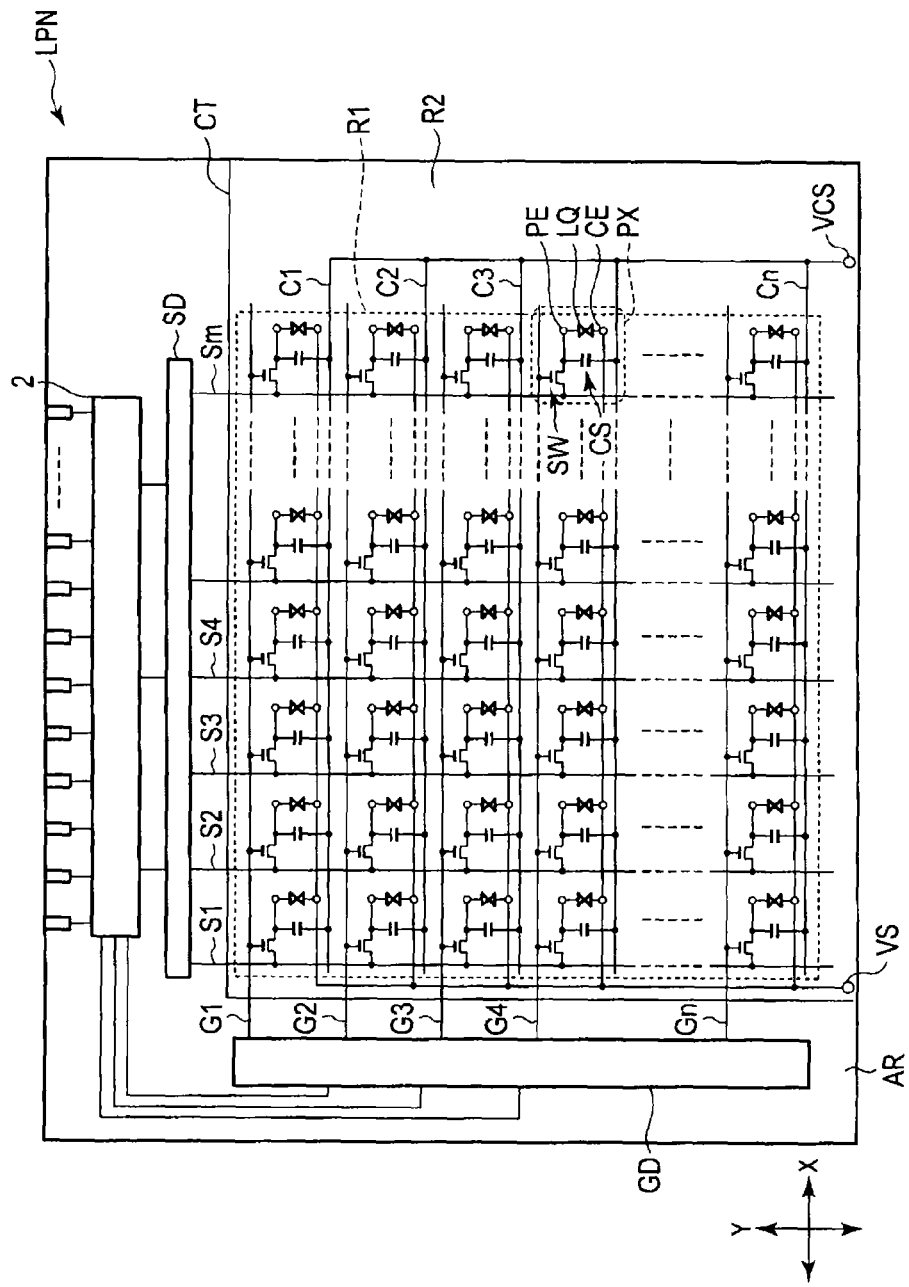
FIG. 1 is a figure schematically showing a structure and the equivalent circuit of a liquid crystal display device according to one embodiment.

A liquid crystal display device according to an exemplary embodiment of the present invention will now be described with reference to the accompanying drawings wherein the same or like reference numerals designate the same or corresponding portion s throughout the several views.

According to one embodiment, a liquid crystal display device includes: a first substrate; a second substrate arranged facing the first substrate with a gap; a plurality of pixels arranged in a matrix of a first direction and a second direction orthogonally crossing the first direction, the length of the pixel along the first direction being shorter than that along the second direction, and each pixel including; a main pixel electrode formed on the first substrate extending in the second direction, and main common electrodes formed on the second substrate extending in the second direction and arranged so as to sandwich the main pixel electrode in the first direction, wherein each pixel includes a plurality of regions in which an inter-electrode distance between the main pixel electrode and the main common electrode in the first direction differs mutually in the respective regions.

FIG. 1 is a figure schematically showing a structure and the equivalent circuit of a liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes a display area R1 which displays images. The display area R1 overlaps with the array substrate AR, the counter substrate CT and the liquid crystal layer LQ. The display area R1 is constituted by a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "m" source lines S (S1-Sm), etc., in the display area R1. The gate line G and the auxiliary capacitance line C linearly extend in a first direction X, for example. The gate line G and the auxiliary capacitance line C are arranged in turns along a second direction Y that orthogonally intersects the first direction X. The source lines S cross the gate lines G and the auxiliary capacitance lines C. The source lines S linearly extend in the second direction Y. The gate line G, the auxiliary capacitance line C and the source line S do not necessarily extend linearly, and a portion thereof may be crooked partially.

Each gate line G is pulled out to outside of the display area R1, and is connected to a gate driver GD. Each source line S is pulled out to the outside of the display area R1, and is connected to a source driver SD. At least a portion of the gate driver GD and the source driver SD is formed in the array substrate AR, for example, and is connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which an auxiliary capacitance voltage is impressed.

In addition, in the liquid crystal display panel LPN according to this embodiment, while the pixel electrode PE is formed in the array substrate AR, at least one portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is an oblique electric field slightly oblique with respect to an X-Y pane specified by the first direction and the second direction, i.e., the substrates (or lateral electric field substantially in parallel with the principal surface of the substrate).

The switching element SW is constituted by an n channel type thin film transistor (TFT), for example. The switching element SW is electrically connected with the gate line G and the source line S. The switching element SW may be either a top-gate type or a bottom-gate type. Though the semiconductor layer is formed of poly-silicon, the semiconductor layer may be formed of amorphous silicon.

The pixel electrode PE is arranged in each pixel PX and electrically connected with the switching element SW. The common electrode CE is arranged in common to the plurality of pixel electrodes PE of the pixels PX through the liquid crystal layer LQ. Though the pixel electrode PE and the common electrode CE are formed by light transmissive conductive materials, such as Indium Tin Oxide (ITO), Indium Zinc Oxide (IZO), etc., other metals such as aluminum may be used.

The array substrate AR includes an electric power supply portion VS for impressing a common voltage to the common electrode CE. The electric power supply portion VS is, for example, formed in a non-display area R2 outside of the display area R1. Furthermore, the common electrode CE is drawn to outside of the active area R1 and electrically connected with an electric power supply portion VS through an electric conductive component which is not illustrated.

Figure 2A:
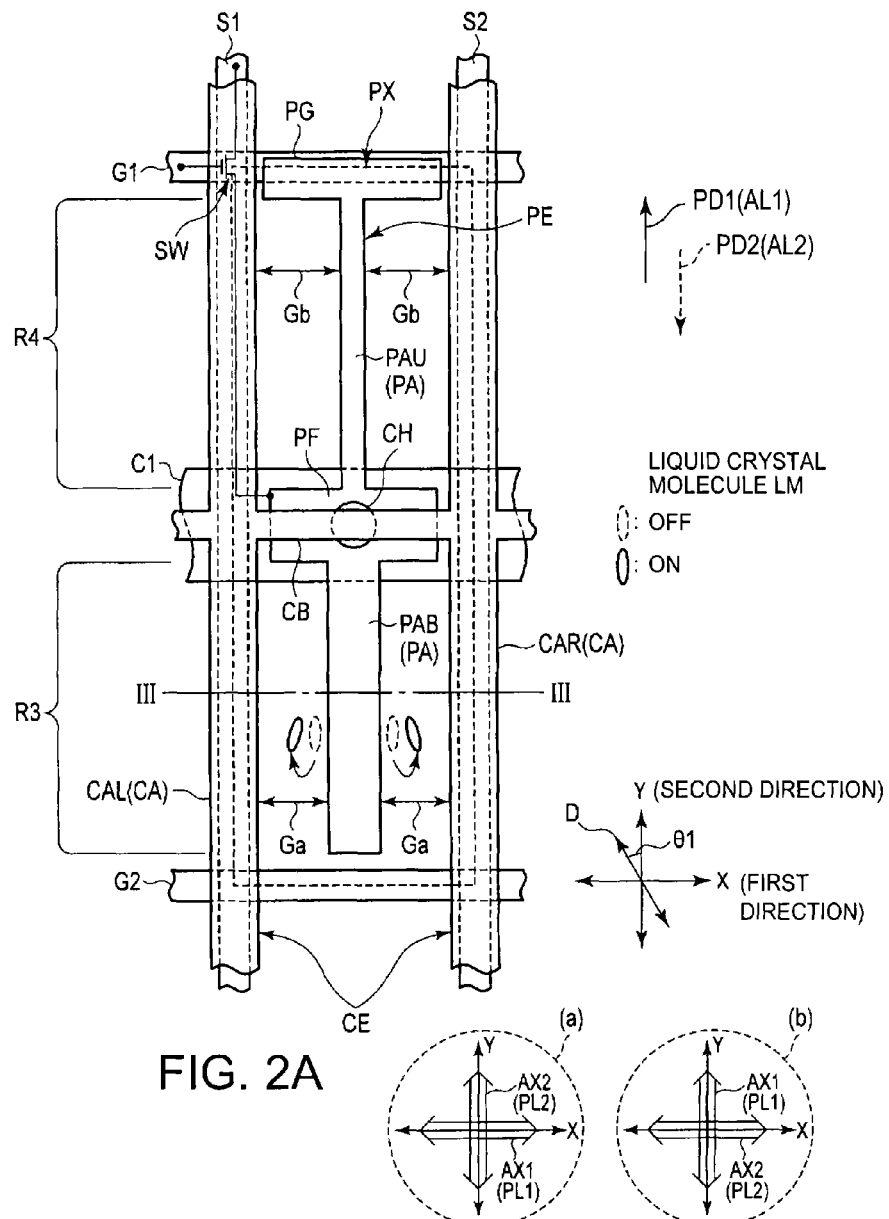
FIG. 2A is a plan view schematically showing a structure of one pixel when the liquid crystal display panel shown in FIG. 1 is seen from a counter substrate side.

FIG. 2A is a plan view schematically showing the structure of one pixel when the liquid crystal display panel according to a first embodiment is seen from the counter substrate side. Herein, a plan view in the X-Y plane is shown.

In FIG. 2A, the pixel PX has the shape of a rectangle whose length in the first direction X is shorter than the length in the second direction Y, as shown in a dashed line. The gate line G1 and the line G2 extend in the first direction X, respectively. The auxiliary capacitance line C1 is arranged between the adjacent gate line G1 and gate line G2 and extends in the first direction X. The source line S1 and the source line S2 extend along the second direction Y, respectively. The pixel electrode PE is located between the adjacent source line S1 and source line S2. The pixel electrode PE is also located between the gate line G1 and the gate line G2.

In the illustrated example, the source line S1 is arranged at the left-hand side end in the pixel PX. Precisely, the source line S1 is arranged striding over a boundary between the illustrated pixel and a pixel PX adjoining the illustrated pixel PX on the left-hand side. The source line S2 is arranged at the right-hand side end. Precisely, the source line S2 is arranged striding over a boundary between the illustrated pixel and a pixel PX adjoining the illustrated pixel PX on the right-hand side. Moreover, in the pixel PX, the gate line G1 is arranged at an upper end portion. Precisely, the gate line G1 is arranged striding over a boundary between the illustrated pixel and a pixel which adjoins the illustrated pixel PX on its upper end side. The gate line G2 is arranged at a lower end portion. Precisely, the gate line G2 is arranged striding over a boundary between the illustrated pixel and a pixel adjoining the illustrated pixel PX on its lower end side. The auxiliary capacitance line C1 is arranged substantially in the center of the pixel.

The switching element SW is electrically connected with the gate line G1 and the source line S1 in the illustrated example. Namely, the switching element SW is formed in an intersection of the gate line G1 and the source line S1. A drain line extending along the source line S1 and the auxiliary capacitance line C1 is electrically connected with the pixel electrode PE in a region which overlaps with the auxiliary capacitance line C1 through a contact hole CH. The switching element SW is formed in the overlapped region with the source line S1 and the auxiliary capacitance line C1, and hardly runs off the overlapped region. Thereby, reduction of the area of an aperture portion which contributes to the display is suppressed when the switching element SW is arranged in the pixel PX.

A plurality of pixel electrodes PE is arranged with a gap therebetween in the first direction X and the second direction Y. The plurality of pixel electrodes PE includes one or more main pixel electrodes PA formed extending along the second direction Y, respectively.

In this embodiment, the pixel electrode PE includes a main pixel electrode PA, a sub-pixel electrode PF, and a sub-pixel electrode PG electrically connected mutually. Hereinafter, in order to distinguish the main pixel electrode PA, the main pixel electrode of the upper portion in the figure is called PAU, and the main pixel electrode of the lower portion in the figure is called PAB.

The main pixel electrode PAB linearly extends along the second direction Y from the sub-pixel electrode PF to a vicinity of a lower end of the pixel PX. The main pixel electrode PAB is formed in the shape of a belt having substantially the same width along the first direction X. The main pixel electrode PAU linearly extends along the second direction Y from the sub-pixel electrode PF to a vicinity of an upper end of the pixel PX. The main pixel electrode PAU is formed in the shape of a belt having substantially the same width along the first direction X.

The sub-pixel electrode PF extends along the first direction X. The sub-pixel electrode PF is located in a region which overlaps with the auxiliary capacity line C1, and is electrically connected with the switching element SW through the contact hole CH.

The sub-pixel electrode PG extends along the first direction X. The sub-pixel electrode PG is located near the upper end of the pixel PX. The sub-pixel electrode PG is electrically connected with the main pixel electrode PAU.

The sub-pixel electrodes PF and PG are formed more broadly than the main pixel electrodes PAB and PAU. The pixel electrode PE is arranged in the center of the pixel PX. The inter-electrode distance between the source line S1 and the main pixel electrode PAB in the first direction X is substantially the same as that between the source line S2 and the main pixel electrode PAB in the first direction X. The inter-electrode distance between the source line S1 and the main pixel electrode PAU in the first direction X is substantially the same as that between the source line S2 and the main pixel electrode PAU in the first direction X.

The common electrodes CE includes a pair of common electrodes CA arranged on both sides of the main pixel electrode PAB and PAU and extending along the second direction Y. In this embodiment, the common electrode CE includes the pair of main common electrodes CA and a sub-common electrode CB.

The main common electrodes CA are formed on the counter substrate CT side. The main common electrodes CA are arranged in the first direction X apart from each other in the X-Y plane sandwiching the main pixel electrodes PAB and PAU in the first direction X, respectively, and linearly extend along the second direction Y substantially in parallel with the main pixel electrodes PAB and PAU. The main common electrodes CA counter with the source line S, respectively. The main common electrode CA is formed in the shape of a belt having substantially the same width along the first direction X.

In the illustrated example, the pair of main common electrodes CA is arranged in two lines along the first direction X, and is arranged at the right-and-left both ends of the pixel PX, respectively. Hereafter, in order to distinguish the main common electrodes CA, the main common electrode of the left-hand side in the figure is called CAL, and the main common electrode of the right-hand side in the figure is called CAR. The main common electrode CAL counters with the source line S1, and the main common electrode CAR counters with the source line S2.

In the pixel PX, the main common electrode CAL is arranged at the left-hand side end, and the main common electrode CAR is arranged at the right-hand side end. Precisely, the main common electrode CAL is arranged striding over a boundary between the illustrated pixel PX and the adjoining pixel PX on its left-hand side, and the main common electrode CAR is arranged striding over a boundary between the illustrated pixel PX and the adjoining pixel PX on its right-hand side.

If its attention is paid to the positional relationship between the pixel electrode PE and the main common electrode CA, the pixel electrode PE and the main common electrode CA are arranged by turns along the first direction X. The pixel electrodes PE (the main pixel electrode PA) and the main common electrode CA are arranged substantially in parallel. At this time, neither of the main common electrodes CA overlaps with the pixel electrode PE in the X-Y plane.

One pixel electrode PE is arranged between the adjoining main common electrode CAL and main common electrode CAR. That is, the pair of main common electrodes (the main common electrode CAL and the main common electrode CAR) is arranged on the both sides which face across a position right above the pixel electrode PE. The pixel electrode PE is arranged between the main common electrode CAL and the main common electrode CAR. For this reason, the main common electrode CAL, the pixel electrode PE (the main pixel electrode PA), and the main common electrode CAR are arranged along the first direction X in this order.

A sub-common electrode CB is arranged in the center of the pixel PX extending in the first direction X. The sub-common electrode CB is arranged so as to counter with the auxiliary capacity line C. According to this embodiment, the sub-common electrode CB is formed on the counter substrate CT side, and is formed integrally or continuously with the main common electrodes CA.

For this reason, the sub-common electrode CB is electrically connected with the main common electrodes CA. The voltage (common voltage) supplied from the electric power supply portion VS is supplied to the main common electrodes CA and the sub-common electrode CB.

Each pixel PX includes two regions R3 and R4 in which the inter-electrode distance between the main pixel electrode PA and the main common electrode CA in the first direction X differs mutually in the regions R3 and R4. In this embodiment, the width of the main pixel electrode PAB in the region R3 differs from that of the main pixel electrode PAU in the region R4 in each pixel PX. The width of the main pixel electrode PAB arranged in the region R3 is larger than that of the main pixel electrode PAU arranged in the region R4. An inter-electrode distance Ga between the main pixel electrode PAB and the main common electrode CA is smaller than an inter-electrode distance Gb between the main pixel electrode PAU and the main common electrode CA.

The regions R3 and R4 of each pixel PX are separated by a region on a wiring layer formed on the array substrate AR or the counter substrate CT extending along the first direction X. In this embodiment, the above-mentioned wiring layer is the auxiliary capacity line C1 and the sub-common electrode CB. The regions R3 and R4 in each pixel PX are adjacent in the second direction Y, each other.

Figure 3:
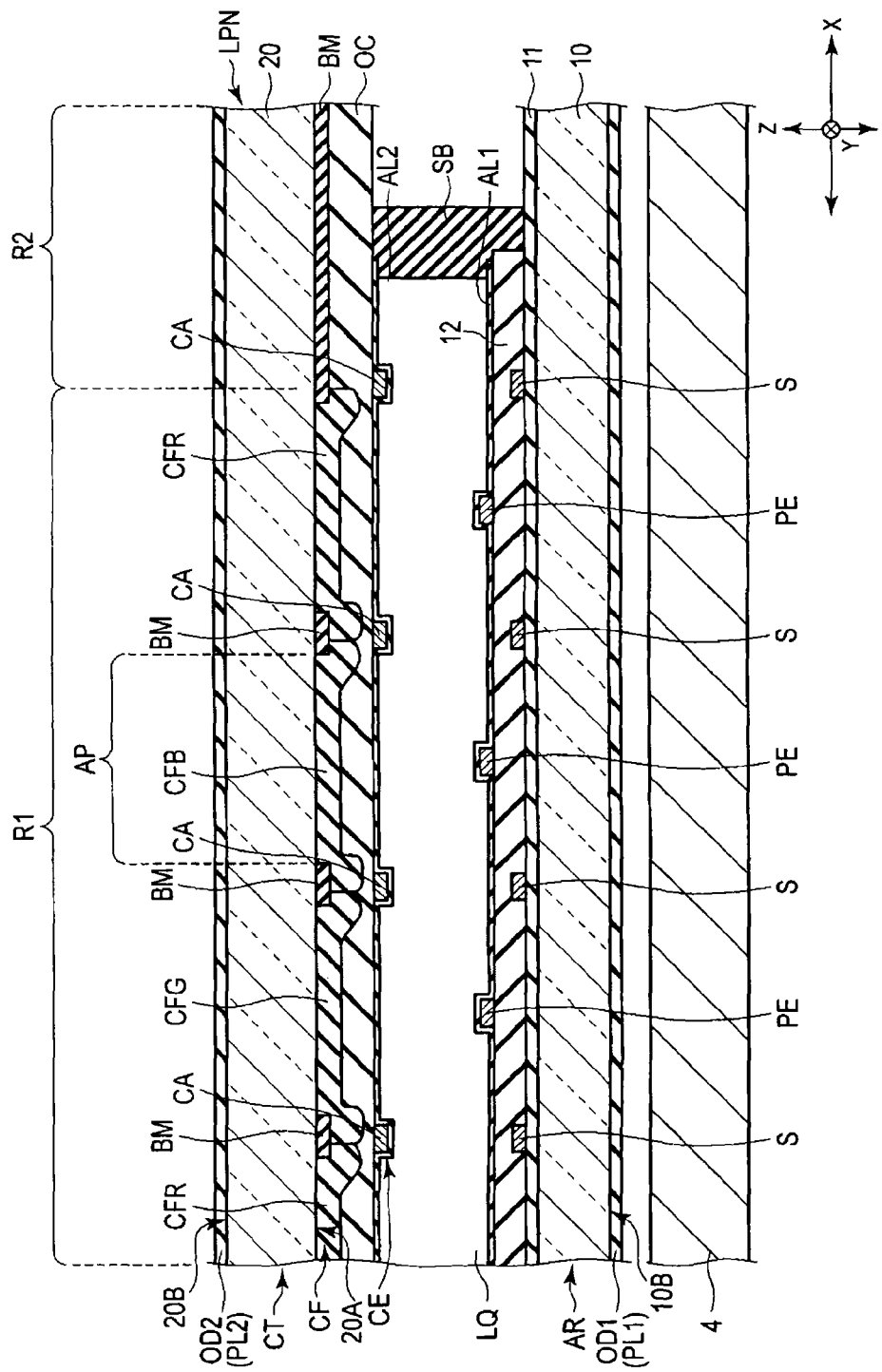
FIG. 3 is a cross-sectional view schematically showing the structure taken along line III-III in the liquid crystal display panel shown in FIG. 2A.

FIG. 3 is a cross-sectional view schematically showing a structure taken along line III-III in the liquid crystal display panel LPN shown in FIG. 2A. In addition, only a portion required for explanation is illustrated here. The backlight unit 4 is arranged on the back side of the array substrate AR as shown in FIG. 3. Various types of backlight unit 4 can be used. For example, a light emitting diode (LED) or a cold cathode fluorescent lamp (CCFL), etc., can be applied as a light source of the backlight unit 4, and the explanation about its detailed structure is omitted.

The array substrate AR is formed using a first insulating substrate 10 which has a transmissive characteristics. The source line S is formed on a first interlayer insulating film 11, and is covered with a second interlayer insulating film 12. In addition, the gate line and the auxiliary capacitance line which are not illustrated are arranged between the first insulating substrate 10 and the first interlayer insulating film 11, for example. The pixel electrode PE is formed on the second interlayer insulating film 12. The pixel electrode PE is located inside of the pixel rather than the positions on the respective adjoining source lines S.

A first alignment film AL1 is arranged on the array substrate AR facing the counter substrate CT, and extends to whole active area R1. The first alignment film AL1 covers the pixel electrode PE, etc., and is arranged also on the second interlayer insulating film 12. The first alignment film AL1 is formed of the material which shows a horizontal alignment characteristics. In addition, the array substrate AR may be further equipped with a portion of the common electrodes CE.

The counter substrate CT is formed using a second insulating substrate 20 which has a transmissive characteristics. The counter substrate CT includes a black matrix BM, a color filter CF, an overcoat layer OC, the common electrode CE, and a second alignment film AL2, etc.

The black matrix BM defines each pixel PX, and forms an aperture portion AP facing the pixel electrode PE. That is, the black matrix BM is arranged so that wiring portions, such as the source line, the gate line, the auxiliary capacitance line, and the switching element, may counter with the black matrix BM. Herein, though only a portion of the black matrix BM extending along the second direction Y is shown, the black matrix BM may include a portion extending along the first direction X. The black matrix BM is formed on an internal surface 20A of the second insulating substrate 20 facing the array substrate AR.

A color filter CF is arranged corresponding to each pixel PX. That is, while the color filter CF is arranged in the aperture portion AP in the internal surface 20A of the second insulating substrate 20, a portion thereof runs on the black matrix BM. The colors of the color filters CF arranged in the adjoining pixels PX in the first direction X differ mutually. For example, the color filters CF are formed of resin materials colored by three primary colors of red, blue, and green, respectively. The red color filter CFR formed of resin material colored in red is arranged corresponding to the red pixel. The blue color filter CFB formed of resin material colored in blue is arranged corresponding to the blue pixel. The green color filter CFG formed of resin material colored in green is arranged corresponding to the green pixel. The boundary between the adjoining color filters CF is located in a position which overlaps with the black matrix BM.

The overcoat layer OC covers the color filter CF. The overcoat layer OC eases influence of concave-convex of the surface of the color filter CF.

The common electrode CE is formed on the overcoat layer OC facing the array substrate AR. The distance between the common electrode CE and the pixel electrode PE along a third direction Z is substantially the same. Here, the third direction Z is a direction which intersects perpendicularly the first direction X and the second direction Y, or a normal line direction of the liquid crystal panel LPN.

The second alignment film AL2 is arranged on the counter substrate CT facing the array substrate AR, and extends to whole display area R1. The second alignment film AL2 covers the common electrode CE, the overcoat layer OC, etc. The second alignment film AL2 is formed of a material showing horizontal alignment characteristics.

An alignment treatment (for example, rubbing processing or light alignment processing) is performed to the first alignment film AL1 and the second alignment film AL2 to initially align the molecules of the liquid crystal layer LQ. A first alignment treatment direction PD1 in which the first alignment film AL1 initially aligns the molecules of the liquid crystal layer LQ and a second alignment treatment direction PD2 in which the second alignment film AL2 initially aligns the molecules of the liquid crystal layer LQ are in parallel, and the same direction or opposite direction each other. For example, the first alignment treatment direction PD1 and the second alignment treatment direction PD2 are in parallel with the second direction Y and are opposite directions each other.

In this embodiment, the first alignment film AL1 and the second alignment film AL2 can initially align the liquid crystal molecules near the first and second alignment films AL1 and AL2 in the second direction Y.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap, is formed, for example. The array substrate AR and the counter substrate CT are pasted together by seal material SB outside of the display area R1, in which the predetermined cell gap is formed.

The liquid crystal layer LQ is held at the cell gap formed between the array substrate AR and the counter substrate CT, and is arranged between the first alignment film AL1 and the second alignment film AL2. The liquid crystal layer LQ contains the liquid crystal molecule which is constituted by positive type liquid crystal material. In addition, the gap Ga between the main pixel electrode PAB and the main common electrode CA is larger than the thickness of the liquid crystal layer LQ, and practically, it is desirable that the gap Ga has a thickness larger than twice that of the liquid crystal layer LQ. Regarding the relation among the thickness of the liquid crystal layer LQ, the gap Ga and the gap Gb, the gap Ga is larger than that of the liquid crystal layer LQ, and smaller than the gap Gb. That is, it is desirable to have a following relation: the thickness of the liquid crystal layer LQ<Ga<Gb.

A first optical element OD1 is attached on an external surface 10B of the array substrate AR, i.e., the external surface of the first insulating substrate 10 which constitutes the array substrate AR, by adhesives, etc. The first optical element OD1 is located on a side which counters with the backlight unit 4 of the liquid crystal display panel LPN, and controls the polarization state of the incident light which enters into the liquid crystal display panel LPN from the backlight unit 4. The first optical element OD1 includes a first polarizing plate PL1 having a first polarization axis (or first absorption axis) AX1.

A second optical element OD2 is attached on an external surface 20B of the counter substrate CT, i.e., the external surface of the second insulating substrate 20 which constitutes the counter substrate CT, by adhesives, etc. The second optical element OD2 is located on a display surface side of the liquid crystal display panel LPN, and controls the polarization state of emitted light from the liquid crystal display panel LPN. The second optical element OD2 includes a second polarizing plate PL2 having a second polarization axis (or second absorption axis) AX2.

The first polarization axis AX1 of the first polarizing plate PL1 and the second polarization axis AX2 of the second polarizing plate PL2 are arranged in the Cross Nicol state in which they substantially intersects perpendicularly. At this time, one polarizing plate is arranged, for example, so that its polarization axis is arranged in the initial aliment direction, that is, in parallel with or in orthogonal with the first alignment treatment direction PD1 or the second alignment treatment direction PD2. When the initial alignment direction is in parallel with the second direction Y, the polarizing axes of one polarizing plate is in parallel with the second direction Y or the first direction X.

Figure 2B:
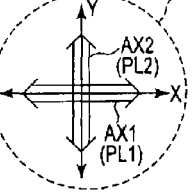
FIGS. 2B and 2C are figures showing the relation between polarizing plates and an initial alignment direction.

An example shown in FIG. 2B, the first polarizing plate PL1 is arranged, for example, so that the first polarization axis AX1 is arranged orthogonally crossing the initial alignment direction (second direction Y) of the liquid crystal molecule LM, i.e., in parallel with the first direction X. The second polarizing plate PL2 is arranged, for example, so that the second polarization axis AX2 is arranged in parallel with the initial alignment direction (second direction Y) of the liquid crystal molecule LM.

Figure 2C:
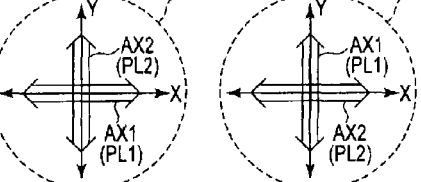

An example shown in FIG. 2C, the second polarizing plate PL2 is arranged, for example, so that the second polarization axis AX2 is arranged orthogonally crossing the initial alignment direction (second direction Y) of the liquid crystal molecule LM, i.e., in parallel with the first direction X. The first polarizing plate PL1 is arranged, for example, so that the first polarization axis AX1 is arranged in parallel with the initial alignment direction (second direction Y) of the liquid crystal molecule LM.

Next, the operation of the liquid crystal display panel LPN of the above-mentioned structure is explained. As shown in FIGS. 2A and 2B, and FIG. 3, at the time of non-electric field state (OFF), i.e., when a potential difference (i.e., electric field) is not formed between the pixel electrode PE and the common electrode CE, the liquid crystal molecules LM of the liquid crystal layer LQ are aligned so that their long axis are aligned in parallel with the first alignment treatment direction PD1 of the first alignment film AL1 and the second alignment treatment direction PD2 of the second alignment film AL2 as shown with a dashed line in the figure. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with the X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. Hereinafter, the explanation is made in the presumption that the liquid crystal molecules LM are aligned in parallel with the X-Y plane and rotates in a plane in parallel with the X-Y plane to simplify the explanation.

Here, both of the first alignment treatment direction PD1 of the first alignment film AL1 and the second alignment treatment direction PD2 of the second alignment film AL2 are directions in parallel to the second direction Y each other. At the time of OFF, the long axis of the liquid crystal molecule LM is initially aligned substantially in parallel to the second direction Y as shown with a dashed line in FIG. 2A. That is, the initial alignment direction of the liquid crystal molecule LM is in parallel to the second direction Y, i.e., makes an angle of 0° with respect to the second direction Y.

In the cross-section of the liquid crystal layer LQ, when the first alignment direction PD1 and the second alignment direction PD2 are in parallel and the same direction each other, the liquid crystal molecule LM is aligned substantially in the horizontal direction (pre-tilt angle is substantially zero) near the intermediate portion of the liquid crystal layer LQ. The liquid crystal molecule LM is aligned with a pre-tilt angle which becomes symmetrical with respect to the intermediate portion in a portion near the first alignment film AL1 and a portion near the second alignment film AL2. That is, the liquid crystal molecule LM is aligned in the splay alignment state.

Here, the liquid crystal molecule LM near the first alignment film AL1 is initially aligned in the first alignment treatment direction PD1 by performing the alignment processing in the first alignment treatment direction PD1, and the liquid crystal molecule LM near the second alignment film AL2 is initially aligned in the second alignment treatment direction PD2 by performing the alignment processing in the second alignment treatment direction PD2. When the first alignment treatment direction PD1 and the second alignment treatment direction PD2 are in parallel and the same direction, the liquid crystal molecule LM becomes the splay alignment state, that is, aligns substantially in the horizontal direction near the intermediate portion of the liquid crystal layer LQ. The liquid crystal molecule LM aligns in symmetrical with respect to the intermediate portion in vicinities of the first alignment film AL1 on the array substrate AR and the second alignment film AL2 on the counter substrate CT. In the splay alignment state of the liquid crystal molecule LM, the display is optically compensated even in an inclining direction from the normal direction of the substrate by the molecules near the first alignment film AL1 and the second alignment film AL2. Therefore, when the first alignment film AL1 and the second alignment film AL2 are in parallel and the same direction mutually, optical leak is hardly generated in a black state. Accordingly, high contrast ratio can be realized, and it becomes possible to improve display grace.

In addition, when the first alignment treatment direction PD1 and the second alignment treatment direction PD2 are in parallel and opposite direction each other in the cross section of the liquid crystal layer LQ, the liquid crystal molecule LM aligns with a uniform pre-tilt angle in the intermediate portion, near the first alignment film AL1, and near the second alignment film AL2 of the liquid crystal layer LQ (homogeneous alignment).

The backlight from the backlight 4 penetrates the first polarizing plate PL1, and enters into the liquid crystal display panel LPN. The polarization state of the incident light changes with the alignment state of the liquid crystal molecule LM when the incident light passes the liquid crystal layer LQ. The incident light which penetrates the liquid crystal display panel LPN is absorbed by the second polarizing plate PL2 (black display).

On the other hand, in case potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecules LM are affected by the electric field between the pixel electrode PE and the common electrode CE, and the long axis thereof rotates in parallel with the X-Y plane as shown with a solid line in the figure.

In the example shown in FIG. 2A, in the region between the pixel electrode PE and the main common electrode CAL, the liquid crystal molecule LM mainly rotates clockwise to the second direction Y, and aligns so that it may turn to the lower left in the figure. On the other hand, in the region between the pixel electrode PE and the main common electrode CAR, the liquid crystal molecule LM mainly rotates counterclockwise to the second direction Y, and aligns so that it may turn to the lower light in the figure.

Thus, in each pixel PX, in case electric field is formed between the pixel electrode PE and the common electrode CE, the alignment direction of the liquid crystal molecule LM is divided into two or more directions by the position which overlaps with the pixel electrode PE, and domains are formed in each alignment direction. That is, two or more domains are formed in one pixel PX.

At the time ON as above, a portion of the backlight from the backlight 4 penetrates the first polarizing plate PL1, and enters into the liquid crystal display panel LPN. The polarization state of the incident light changes with the alignment state of the liquid crystal molecule LM when the incident light passes the liquid crystal layer LQ. At the time ON, a portion of the incident light which penetrates the liquid crystal display panel LPN passes the second polarizing plate PL2 (white display).

Figure 4:
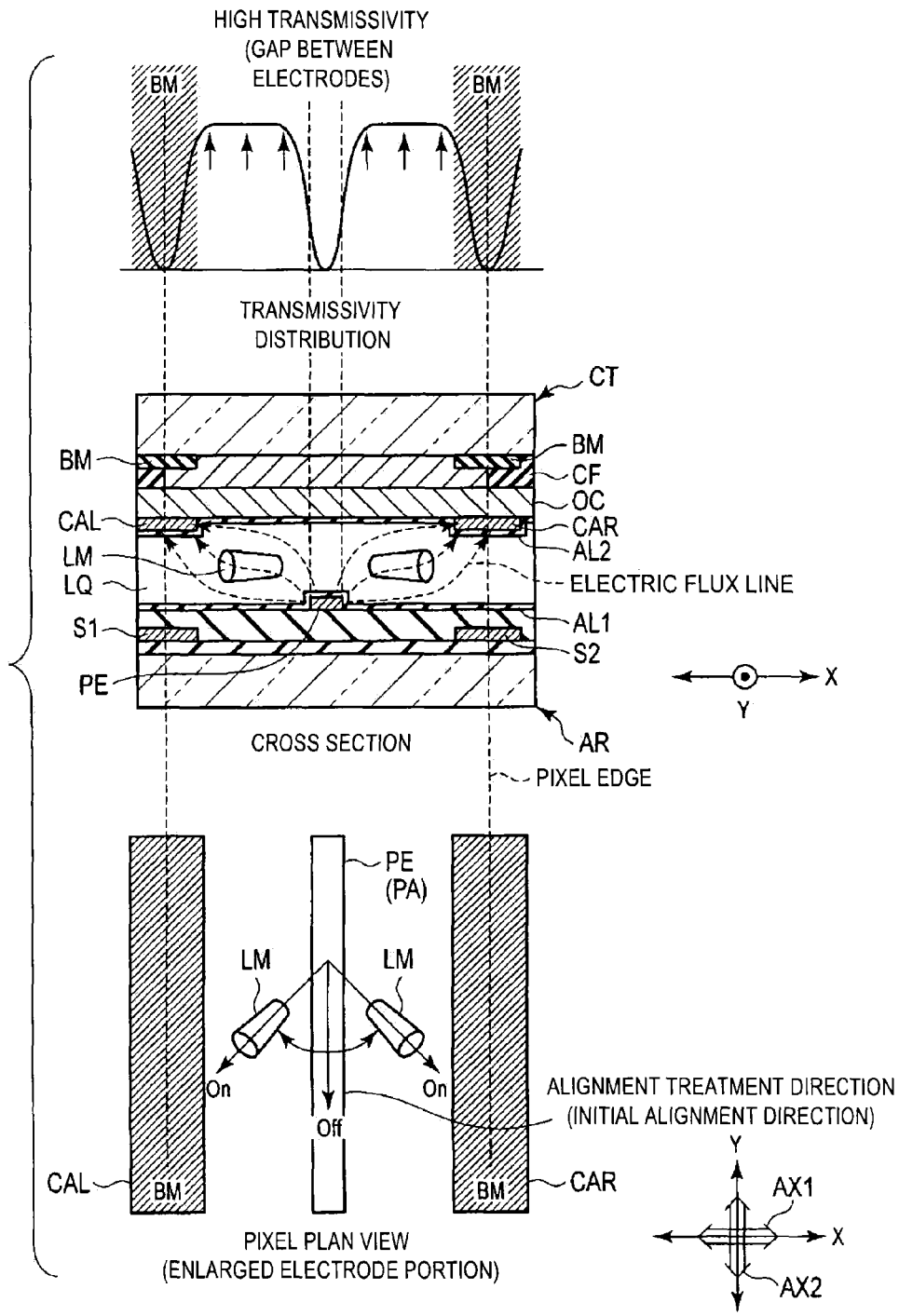
FIG. 4 is a figure showing an electric field formed between a pixel electrode and a common electrode and a relation between a director and a transmissivity of the liquid crystal molecule by this electric field in the liquid crystal display panel shown in FIG. 2A.

FIG. 4 is a figure showing an electric field formed between the pixel electrode PE and the common electrode CE in the liquid crystal display panel LPN shown in FIG. 2, and a relation between a director and a transmissivity of the liquid crystal molecule by this electric field.

As shown in FIG. 4, in the OFF state, the liquid crystal molecule LM is initially aligned substantially in parallel with the second direction Y. In the ON state in which potential difference is formed between the pixel electrode PE and the common electrode CE, when the director or the long axes direction of the liquid crystal molecule LM is shifted substantially by 45° in the X-Y plane with respect to the first polarization axis AX1 of the first polarizing plate PL1 and the second polarization axis AX2 of the second polarizing plate PL2, an optical modulation rate of the liquid crystal molecule becomes the highest. That is, the transmissivity in the aperture portion becomes the maximum.

In the illustrated example, when the liquid crystal molecule changes into the ON state, the director of the liquid crystal molecule LM between the main common electrode CAL and the pixel electrode PE becomes substantially in parallel with a direction of 45°-225° in the X-Y plane. The director of the liquid crystal molecule LM between the main common electrode CAR and the pixel electrode PE becomes substantially in parallel with a direction of 135°-315° in the X-Y plane, and a peak transmissivity is obtained. At this time, if the transmissivity distribution per one pixel is focused, while the transmissivity becomes substantially zero on the pixel electrode PE and the common electrode CE, high transmissivity is obtained in the whole electrode gap between the pixel electrode PE and the common electrode CE.

Here, the inventors investigated the display properties of the liquid crystal display device according to this embodiment. In addition, the display properties of the liquid crystal display device according to a comparative example of this embodiment were investigated.

Figure 5:
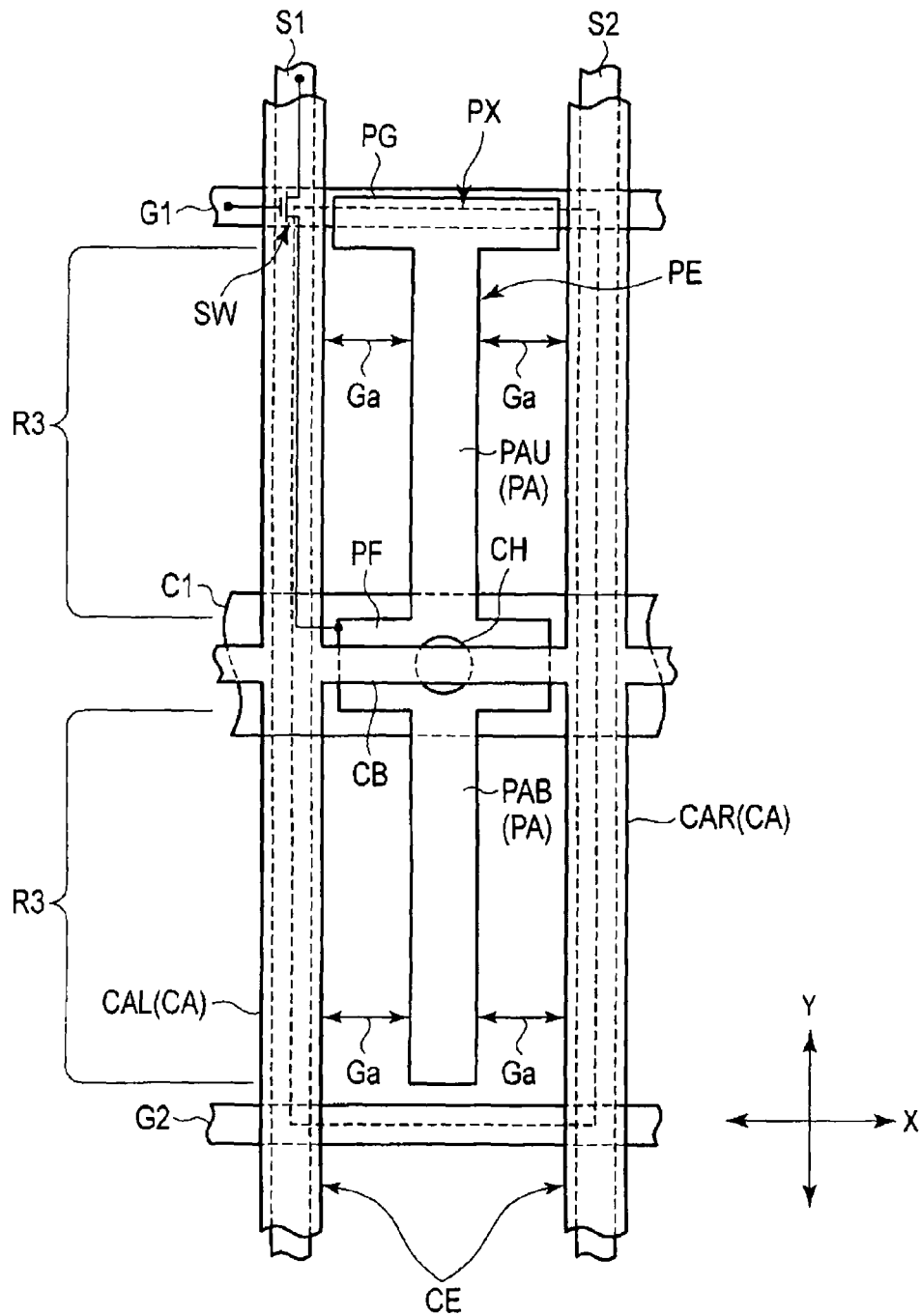
FIG. 5 is a plan view schematically showing a structure of one pixel when the liquid crystal display panel of a comparative example of the embodiment is seen from the counter substrate side

The structure of the liquid crystal display device according to the comparative example is explained. FIG. 5 is a plan view schematically showing a structure of one pixel when the liquid crystal display panel of the comparative example of the embodiment is seen from the counter substrate side As shown in FIG. 5, each pixel PX has two regions R3 in which the inter-electrode distance Ga between the main pixel electrode PAB and the main common electrode CA and between the main pixel electrode PAU and the main common electrode CA in the first direction X is substantially the same. In this comparative example, the widths of the main pixel electrode PAB and the main pixel electrode PAU are the same. In addition, other structures are formed like the liquid crystal display device according to this embodiment.

Figure 6:
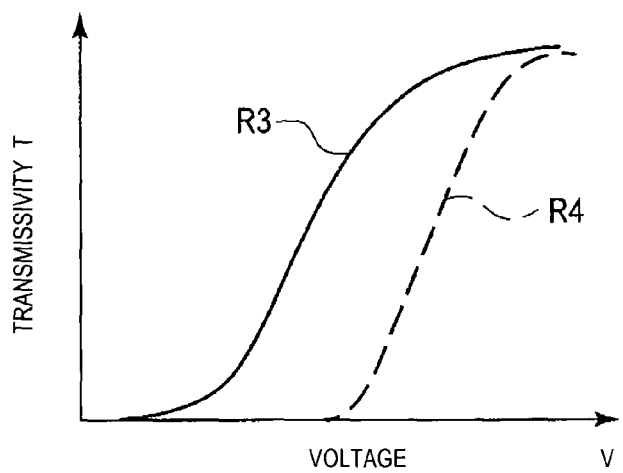
FIG. 6 is a figure showing change of transmissivity with respect to voltage in the liquid crystal display device according to the embodiment and the comparative example in a graph.

FIG. 6 is a figure showing the change of transmissivity T with respect to voltage (potential difference between the pixel electrode PE and the common electrode CE) in the liquid crystal display devices according to the embodiment and the comparative example in a graph.

Since the inter electrode distance is formed so as to be Ga<Gb as shown in FIG. 2A, if the voltage V (potential difference between the pixel electrode PE and the common electrode CE) becomes high as shown in FIG. 6, it turns out that firstly, the rise of the transmissivity T starts in the region R3, and then the rise of the transmissivity T starts in the region R4 when the voltage V becomes higher. The transmissivity T becomes almost the same in the regions R3 and R4 and the maximum if the voltage V becomes much higher. For this reason, it turns out that the same effect as that by a half-tone driving is acquired only by adjusting the voltage V.

Figure 7:
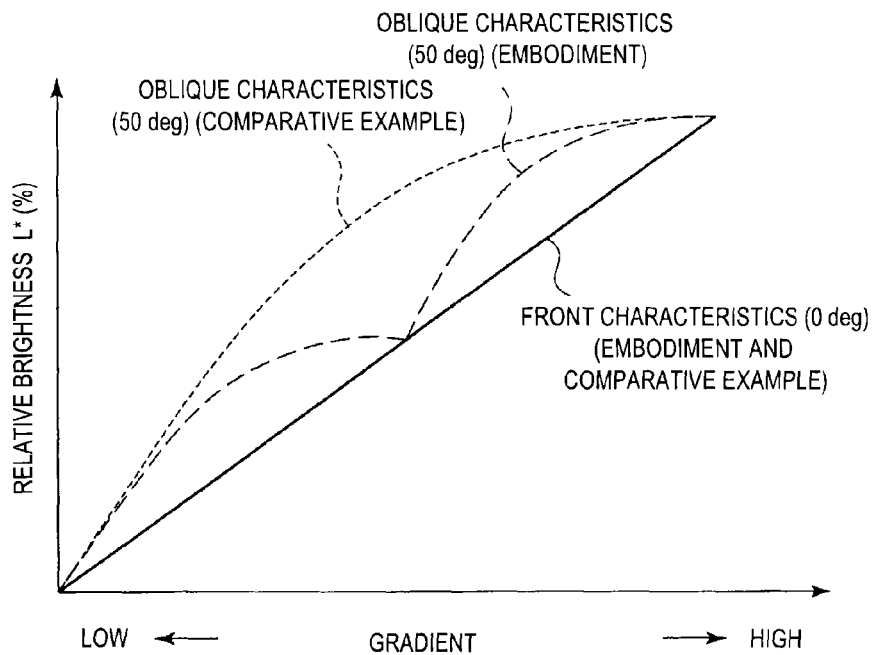
FIG. 7 is a figure showing change of relative brightness with respect to gradient at the time of white display of the liquid crystal display device according to the embodiment and the comparative example in a graph.

FIG. 7 is a figure showing the change of relative brightness L* with respect to gradient at the time of white display in the liquid crystal display devices according to the embodiment and the comparative example in a graph. As shown in FIG. 7, it turns out that the brightness in the front direction (0 deg) of the liquid crystal display device according to this embodiment and the comparative example is the same, each other.

On the other hand, it turns out that the brightness of the liquid crystal display device in an oblique direction (50 deg) inclining by 50° from the front direction to the horizontal direction (first direction X) according to this embodiment and the comparative example is higher than the brightness in the front direction at most of the gradients. This is because the generation of the light leak in the black state is resulted in the oblique direction.

However, when comparing the brightness of the liquid crystal display device according to this embodiment with the liquid crystal display device of the comparative example in the oblique direction is measured, it turns out that the brightness of the liquid crystal display device according to this embodiment is closer to the brightness in the front direction than the brightness of the liquid crystal display device of the comparative example. Especially, in a gray level, it turns out that the brightness of the liquid crystal display device in the oblique direction according to this embodiment is close to the brightness in the front direction.

The pixel PX of the liquid crystal display device according to the comparative example shows only the V-T characteristic of the region R3 in FIG. 6. On the other hand, the pixel PX of the liquid crystal display device according to this embodiment shows both of the V-T characteristics of the regions R3 and R4 in FIG. 6. Since the light leak in the black state in the oblique direction can be controlled, the liquid crystal display device can contribute to expansion of a viewing angle.

In the liquid crystal display device according to this embodiment as mentioned above, the liquid crystal display device is equipped with the array substrate AR, the counter substrate CT, the liquid crystal layer LQ, and the plurality of pixels PX. The pixel PX includes the main pixel electrode PA formed on the array substrate AR extending along the second direction Y, and the main common electrodes CA formed on the counter substrate CT extending along the second direction Y so as to sandwich the main pixel electrode PA therebetween in the first direction X.

Each pixel PX includes two regions R3 and R4 in which the inter-electrode distance between the main pixel electrode PA and the main common electrode CA in the first direction X differs mutually. In the above embodiment, the width of the main pixel electrode PA in the first direction X is changed in the region R3 and the region R4. Since the generating of the light leak in the black state in the oblique direction can be controlled, the embodiment can contribute to the expansion of the viewing angle.

Moreover, according to this embodiment, since it becomes possible to obtain high transmissivity in the electrode gap between the pixel electrode PE and the common electrode CE, it becomes possible to correspond by expanding the inter-electrode distance between the pixel electrode PE and the main common electrode CA in order to make transmissivity of each pixel high enough. Further, in the product specifications in which a pixel pitch differs each other, a transmissive distribution peak shown in FIG. 4 can be used by changing the inter-electrode distance, i.e., by changing the width of the pixel electrode PE arranged substantially in the center of the pixel PX. That is, in the display mode according to this embodiment, it becomes possible to offer the display panel having various pixel pitches by setting up the inter-electrode distance without necessarily using microscopic processing corresponding to the product specification from low resolution with a comparatively large pixel pitch to high resolution with a comparatively small pixel pitch. Therefore, it becomes possible to realize the demand for high transmissivity and high resolution easily.

Moreover, according to this embodiment, the transmissivity fully falls in a region which overlaps with the black matrix BM. This is because the leak of electric field does not occur outside of the pixel from the common electrode CE, and undesired lateral electric field is not produced between the adjoining pixels sandwiching the black matrix BM. That is, it is because the liquid crystal molecule which overlaps with the black matrix BM maintains the initial alignment state like at the time OFF (or the time of the black display). Accordingly, even if it is a case where the colors of the color filter differ between the adjoining pixels, it becomes possible to control the generating of mixed colors, and also becomes possible to control the fall of color reproducibility and the contrast ratio.

Moreover, when an assembling shift occurs between the array substrate AR and the counter substrate CT, a difference may arise in distances between the respective common electrodes CE of the both sides of the pixel and the pixel electrode PE. However, since the assembling shift is generated in common to all the pixels PX, there is no difference in the electric field distribution between the pixels PX, and the influence to the display of the image is very small. Even if the assembling shift arises between the array substrate AR and the counter substrate CT, it becomes possible to control the undesirable electric field leak to the adjoining pixels. For this reason, even if it is in a case where the colors of the color filter differ between the adjoining pixels, it becomes possible to control the generation of the mixed colors, and also becomes possible to suppress the falls of color reproducibility nature and the contrast ratio.

According to this embodiment, the main common electrodes CA counter with the source lines S, respectively. When the main common electrode CAL and the main common electrode CAR are especially arranged on the source line S1 and the source line S2, respectively, the aperture portion AP which contributes to the display can be expanded as compared with the case where the main common electrode CAL and the main common electrode CAR are arranged on the pixel electrode PE side rather than above the source line S1 and the source line S2, and it becomes possible to improve the transmissivity of the pixel PX.

Moreover, it becomes possible to expand the distances between the pixel electrode PE and the main common electrode CAL, and between the pixel electrode PE and the main common electrode CAR by arranging each of the main common electrode CAL and the main common electrode CAR above the source line S1 and the source line S2, respectively, and also becomes possible to form the lateral electric field closer to the horizontal direction. Therefore, it becomes possible to maintain the feature of the wide view angle which is a merit of the IPS mode.

Moreover, according to this embodiment, it becomes possible to form two or more domains in one pixel. For this reason, the viewing angle can be optically compensated in two or more directions, and the wide viewing angle characteristics is attained.

In addition, in the above-mentioned example, since the liquid crystal layer LQ has positive dielectric constant anisotropy, the case where the alignment direction of the liquid crystal molecule LM is in parallel to the second direction Y is explained. However, the initial alignment direction of the liquid crystal molecule LM may be the oblique direction D which obliquely crosses the second direction Y as shown in FIG. 2A. Herein, the angle θ1 which the initial alignment direction D makes with the second direction Y is larger 0° and smaller than 45°. In addition, it is extremely effective to set the angle θ1 in the range of 5° to 30°, more desirably less than 20° in a viewpoint of the alignment control of the liquid crystal molecule LM. That is, it is desirable that the initial alignment direction of the liquid crystal molecule LM is set to a direction substantially in parallel with the direction in the range of 0° to 20° with respect to the second direction Y.

That is, it is desirable to form the first alignment film AL1 so that the first alignment film AL1 initially aligns the liquid crystal molecule LM in the vicinity of the alignment film in the second direction Y or the oblique direction inclining from the second direction Y within 20°. It is also desirable to form the second alignment film AL2 so that the second alignment film AL2 initially aligns the liquid crystal molecule LM in the vicinity of the alignment film in the second direction Y or the oblique direction inclining from the second direction Y within 20°.

Moreover, although the above-mentioned example explains the case where the liquid crystal layer LQ has positive dielectric constant anisotropy, the liquid crystal layer LQ may have negative dielectric constant anisotropy. That is, n type liquid crystal material may be used. Although detailed explanation is omitted, when the negative type liquid crystal material is used, it is desirable that the above-mentioned angle θ1 is made in the range of 45° to 90°, and desirably not less than 70° because the dielectric constant anisotropy becomes a contrast relation between the positive type and the negative type.

That is, it is desirable to form the first alignment film AL1 so that the first alignment film AL1 initially aligns the liquid crystal molecule LM in the vicinity of the alignment film in the first direction X or the oblique direction inclining from the first direction X within 20°. It is also desirable to form the second alignment film AL2 so that the second alignment film AL2 initially aligns the liquid crystal molecule LM in the vicinity of the alignment film in the first direction X or the oblique direction inclining from the first direction X within 20°.

Furthermore, even at the time of ON, since the lateral electric field is hardly formed (or sufficient electric field to drive the liquid crystal molecule LM is not formed) on the pixel electrode PE or the common electrode CE, the liquid crystal molecule LM hardly moves from the initial alignment direction like at the time of OFF. For this reason, as mentioned-above, even if the pixel electrode PE and the common electrode CE are formed of the electric conductive material with the light transmissive characteristics in these domains, the backlight hardly penetrates, and hardly contributes to the display at the time of ON. Therefore, the pixel electrode PE and the common electrode CE do not necessarily need to be formed of a transparent electric conductive material, and may be formed using non-transparent electric conductive materials, such as aluminum (Al), silver (Ag), and copper (Cu).

Furthermore, the common electrode CE may include a second main common electrode (shield electrode) formed on the array substrate AR facing the common electrode CA (or source line S) in addition to the main common electrode CA formed on the counter substrate CT. The second main common electrode extends substantially in parallel with the main common electrode CA and is set to the same potential as the main common electrode CA. It becomes possible to shield undesirable electric field from the source line S by providing the second common electrode.

Moreover, the common electrode CE may include a second sub-common electrode (shield electrode) formed on the array substrate AR facing the gate line G or the auxiliary capacitance line C in addition to the main common electrode CA formed on the counter substrate CT. The second sub-common electrode extends in a direction crossing the main common electrode CA and set to the same potential as the main common electrode CA. It becomes possible to shield undesirable electric field from the gate line G or the auxiliary capacitance line C by providing the second sub-common electrode. It becomes possible further to control the decrease of the display quality according to the structure in which the second main common electrode and the second sub-common electrode are provided. Thereby, a liquid crystal display device with the wide viewing angle can be obtained.

The width of the main common electrode CA may be different every region of each pixel. Since each pixel PX is required to have several regions in which the inter-electrode distance between the main pixel electrode PA and the main common electrode CA in the first direction X differs mutually, it is possible to make the width of at least either one of the main pixel electrode PA and the main common electrode CA different in every region of each pixel PX.

The number of the plurality of regions of the pixel PX, in which the inter electrode distance between the main pixel electrode PA and the main common electrode CA in the first direction X differs mutually may not be limited to two, and may be three or more.

Figure 8:
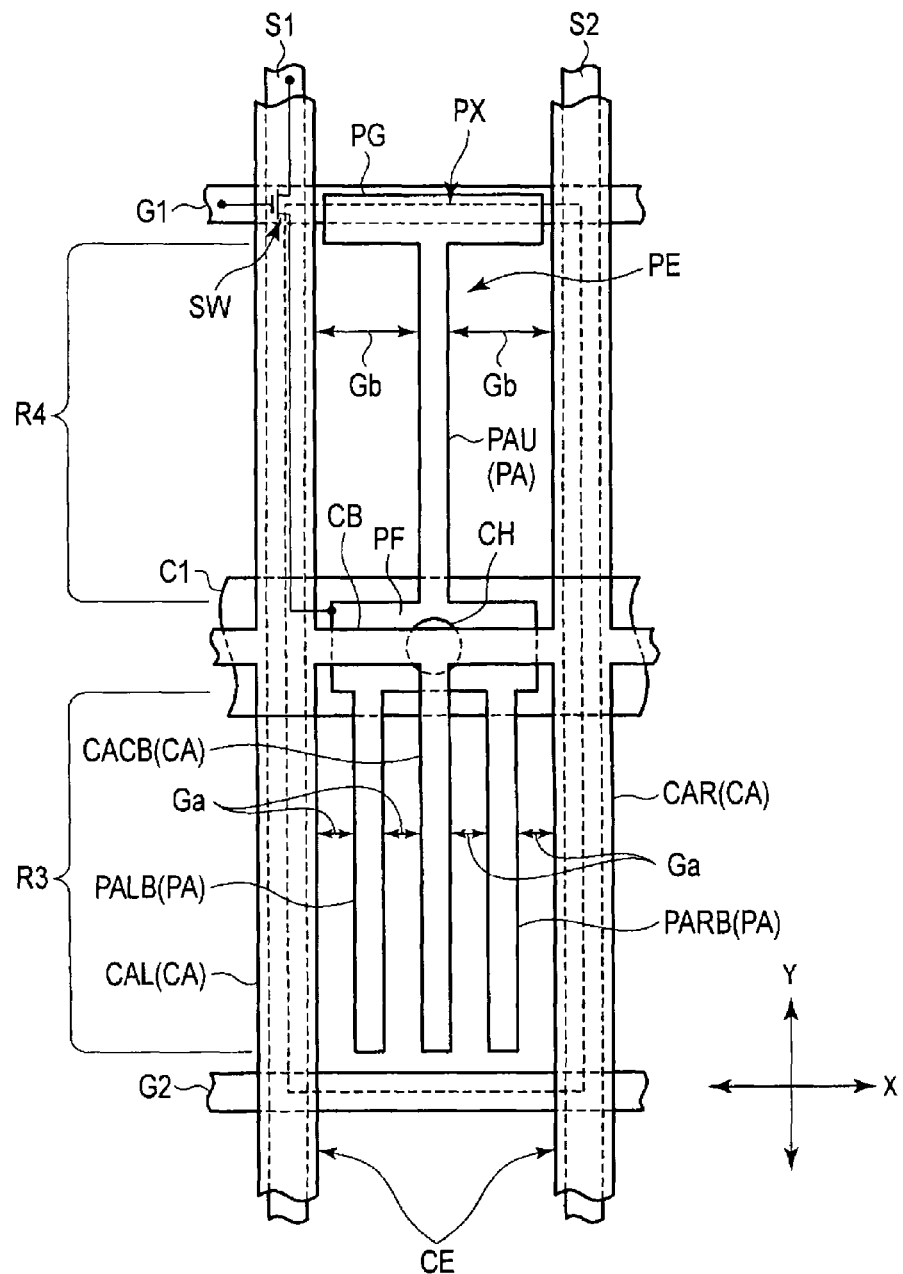
FIG. 8 is a plan view schematically showing a structure of one pixel when the liquid crystal display panel is seen from the counter substrate side according to a second embodiment.

FIG. 8 is a plan view schematically showing a structure of one pixel when the liquid crystal display panel is seen from a counter substrate CT side according to a second embodiment. As shown in FIG. 8, the pixel electrode PE includes the main pixel electrode PA, the sub-pixel electrode PF, and the sub-pixel electrode PG electrically connected mutually. Hereinafter, in order to distinguish the main pixel electrode PA, the main pixel electrode on the upper side in the figure is called PAU, the main pixel electrode on the lower left side in the figure is called PALB, and the main pixel electrode on the lower right side in the figure is called PARB.

The main pixel electrodes PALB and PARB linearly extend along the second direction Y from the sub-pixel electrode PF to near the lower end of the pixel PX. The main pixel electrodes PALB and PARB are formed in the shape of a belt having substantially the same width along the first direction X, respectively. The main pixel electrode PAU linearly extends along the second direction Y from the sub-pixel electrode PF to near the upper end of the pixel PX. The main pixel electrode PAU is formed in the shape of a belt having substantially the same width along the first direction X. The sub-pixel electrodes PF and PG are formed more broadly than the main pixel electrodes PALB, PARB, and PAU. The sub-pixel electrode PF is arranged in the center of the pixel PX.

The common electrode CE includes a plurality of main common electrodes CA and the sub-common electrode CB. Hereinafter, in order to distinguish the main common electrodes CA, the main common electrode arranged in a lower middle portion is called CACB.

The main common electrode CACB is formed on the counter substrate CT side, and is formed integrally or continuously with the sub-common electrode CB. The main common electrode CACB linearly extends along the second direction Y from the sub-common electrode CB to near the lower end of the pixel PX. The main common electrode CACB is formed in the shape of a belt having substantially the same width along the first direction X. In the first direction X, the main common electrode CACB is arranged between the main pixel electrode PALB and the main pixel electrode PARB.

Each pixel PX includes two regions R3 and R4 in which the inter-electrode distance between the main pixel electrode PA and the main common electrode CA in the first direction X differs mutually. In this embodiment, the inter-electrode distance between the main pixel electrode PA and the main common electrode CA in the first direction X differs in two regions R3 and R4 in each pixel PX.

In the illustrated example, the main common electrode CA is arranged in three lines along the first direction X in the region R3, and is arranged in two lines along the first direction X in the region R4. The inter-electrode distances between the main common electrode CAL and the main pixel electrode PALB, the inter-electrode distance between the main common electrode CACB and the main pixel electrode PALB, the inter-electrode distance between the main common electrode CACB and the main pixel electrode PARB, and the inter-electrode distance between the main common electrode CAR and the main pixel electrode PARB, respectively, in the first direction X are substantially the same. The inter-electrode distance between the main common electrode CAL and the main pixel electrode PAU is substantially the same as that between the main common electrode CAR and the main pixel electrode PAU in the X direction.

The inter-electrode distance Ga between the main common electrode CA and the main pixel electrode PA in the region R3 is smaller than the inter-electrode distance Gb between the main common electrode CA and the main pixel electrode PA in the region R4. The region R3 and the region R4 are arranged in adjacent in the second direction Y in each pixel PX.

In addition, the liquid crystal display device according to the second embodiment is formed like the liquid crystal display device according to the first embodiment. Each pixel PX of the liquid crystal display device according to the second embodiment includes the regions R3 and R4 in which the V-T characteristic differs mutually like the pixel of the liquid crystal display device according to the first embodiment. Also in the liquid crystal display device according to the second embodiment, since the light leak of in the black state in the oblique direction can be controlled, the liquid crystal device can contribute to expansion of the viewing angle.

In addition, the sub-pixel electrode PG in FIG. 2A and FIG. 8 may be eliminated.

Figure 9:
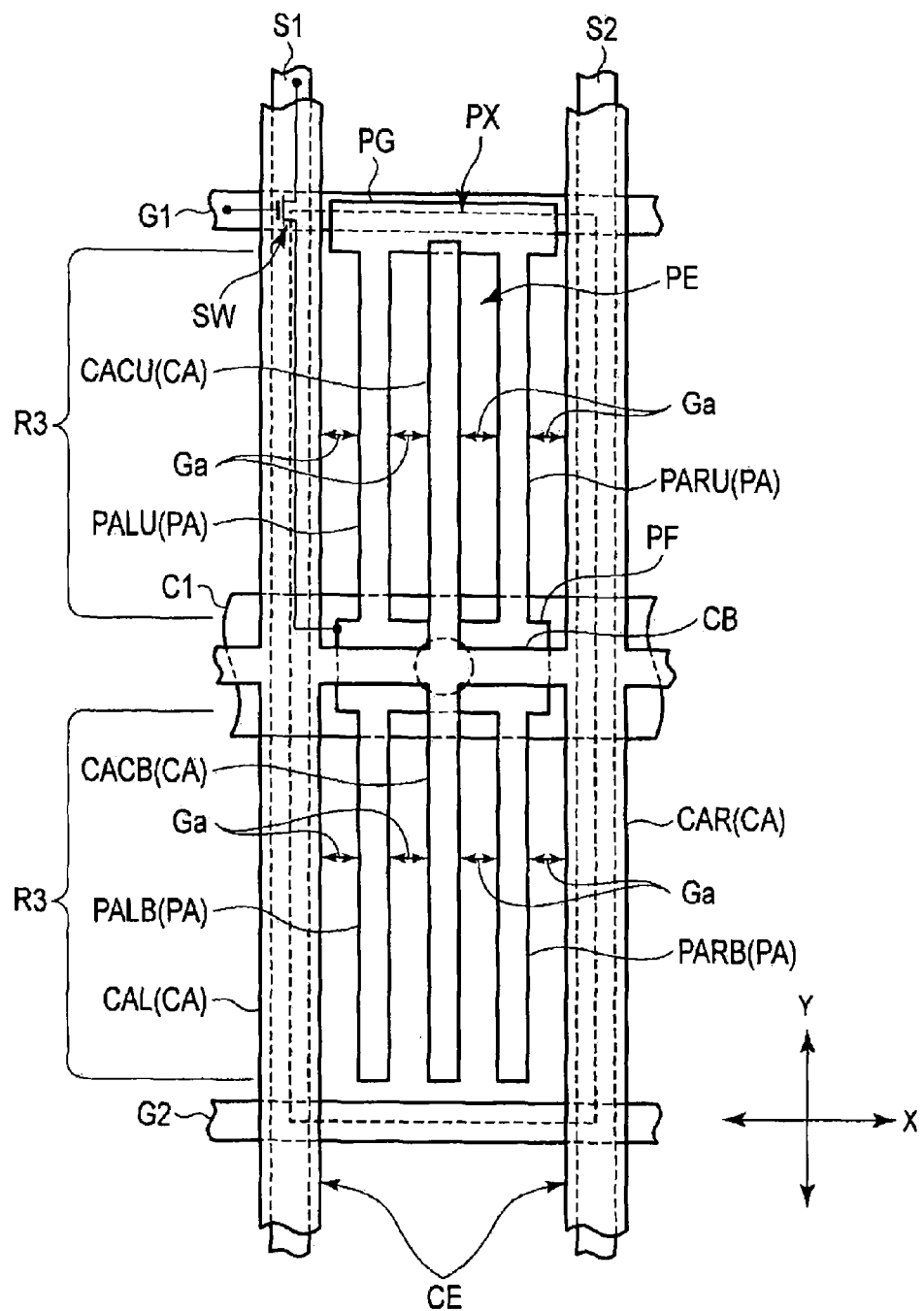
FIG. 9 is a plan view schematically showing a structure of one pixel when the liquid crystal display panel of the comparative example of the second embodiment shown in FIG. 8 is seen from the counter substrate side.

Next, the comparative liquid crystal display device of the second embodiment is explained. FIG. 9 is a plan view schematically showing a structure of one pixel when the liquid crystal display panel of the comparative example of the second embodiment shown in FIG. 8 is seen from the counter substrate side.

As shown in FIG. 9, the pixel electrode PE includes the main pixel electrode PA, the sub-pixel electrode PF, and the sub-pixel electrode PG electrically connected mutually. Hereinafter, in order to distinguish the main pixel electrode PA, the main pixel electrode on the upper left side in the figure is called PALU, and the main pixel electrode on the upper right side in the figure is called PARU.

The main pixel electrodes PALU and PARU linearly extend along the second direction Y from the sub-pixel electrode PF to near the upper end of the pixel PX. The main pixel electrodes PALU and PARU are formed in the shape of a belt having substantially the same width along the first direction X, respectively. The sub-pixel electrodes PF and PG are formed more broadly than the main pixel electrodes PALU and PARU. The sub-pixel electrode PF is arranged in the center of the pixel.

The common electrode CE includes a plurality of main common electrodes CA and the sub-common electrode CB. Hereinafter, in order to distinguish the main common electrodes CA, the main common electrode arranged in an upper middle portion is called CACU.

The main common electrode CACU is formed on the counter substrate CT side, and is formed integrally or continuously with the sub-common electrode CB. The main common electrode CACU linearly extends along the second direction Y from the sub-common electrode CB to near the upper end of the pixel PX. The main common electrode CACU is formed in the shape of a belt having substantially the same width along the first direction X. In the first direction X, the main common electrode CACU is located between the main pixel electrode PALU and the main pixel electrode PARU.

Each pixel PX includes two regions R3 in which the inter-electrode distance between the main pixel electrode PA and the main common electrode CA in the first direction X is the same.

In the illustrated comparative example, the main common electrode CA is arranged in three lines along the first direction X in the two regions R3, respectively. The liquid crystal display device of the above-mentioned comparative example is formed like the liquid crystal display device according to the second embodiment except above points. Since, in each pixel PX of the liquid crystal display device of the above-mentioned comparative example, only the regions R3 are provided, the pixel PX cannot control the generating of the light leak in the black state in the oblique direction as shown in FIG. 6 and FIG. 7

In the embodiments, the wiring layer which separates between the region R3 and the region R4 of each pixel PX is not limited to the auxiliary capacitance line C and the sub-common electrode CB, and can be modified variously. That is, any wiring layers can be used to separate the regions if the wirings are formed on the array substrate AR or the counter substrate CT, and extend along the first direction X. In each pixel PX, several regions in which the inter-electrode distance between the main pixel electrode PA and the main common electrode CA in the first direction X differ mutually may be adjacent in the first direction X. That is, what is necessary is that the regions are adjacent at least in either one of the first direction X and the second direction X.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device, comprising:
   a first substrate including:
      first and second gate lines extending in a first direction,
      first and second source lines extending in a second direction orthogonally crossing the first direction,
      an auxiliary capacitance line arranged between the first and second gate lines in a center of a pixel and extending in the first direction;
   a pixel electrode including:
      a first sub-pixel electrode extending in the first direction and facing the auxiliary capacitance line, and
      a main pixel electrode including a first main pixel electrode extending in the second direction from the first sub-pixel electrode to the first gate line side in a stripe shape with a first constant width and a second main pixel electrode extending in the second direction from the first sub-pixel electrode to the second gate line side in a stripe shape with a second constant width, the second constant width being larger than the first constant width;
   a second substrate arranged facing the first substrate with a gap; and
   a liquid crystal layer held between the first substrate and the second substrate.

2. The liquid crystal display device according to claim 1, wherein the first main pixel electrode includes a second sub-pixel electrode extending in the first direction and facing the first gate line.

3. The liquid crystal display device according to claim 1, wherein the second substrate includes a pair of main common electrodes facing the first and second source lines, respectively.

4. The liquid crystal display device according to claim 3, wherein an interval between the main common electrode and the first main pixel electrode is larger than an interval between the main common electrode and the second main pixel electrode.

5. The liquid crystal display device according to claim 4, wherein a thickness of the liquid crystal layer is smaller than the interval between the second main pixel electrode and the main common electrode.

6. The liquid crystal display device according to claim 3, wherein the main common electrode includes a sub-common electrode extending in the first direction and facing the auxiliary capacitance line and the first sub-pixel electrode.

* * * * *